(No Model.) H. W. FORD. 2 Sheets—Sheet 1.
COMBINATION VEHICLE.
No. 460,373. Patented Sept. 29, 1891.
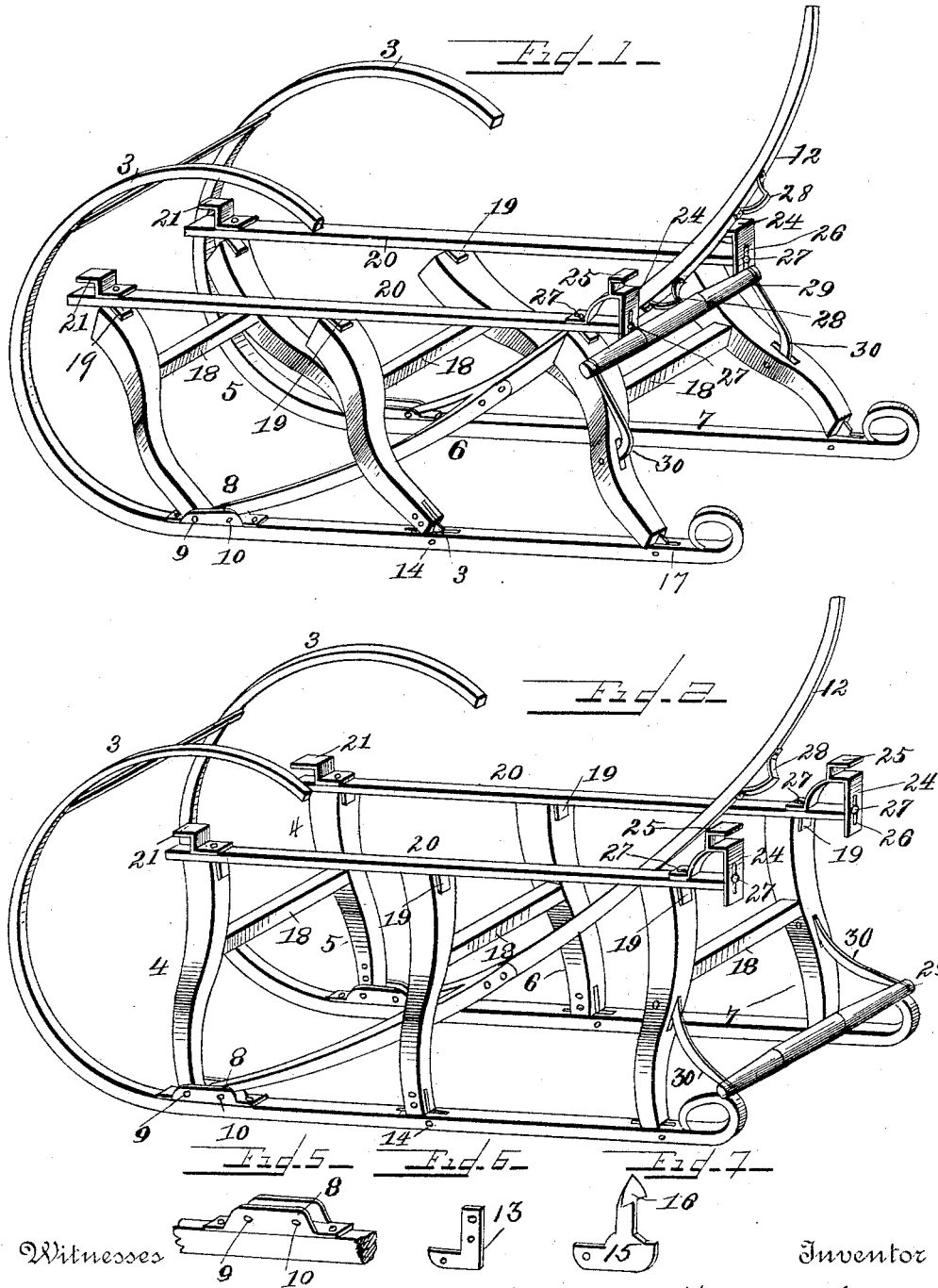

(No Model.) 2 Sheets—Sheet 2.
H. W. FORD.
COMBINATION VEHICLE.
No. 460,373. Patented Sept. 29, 1891.
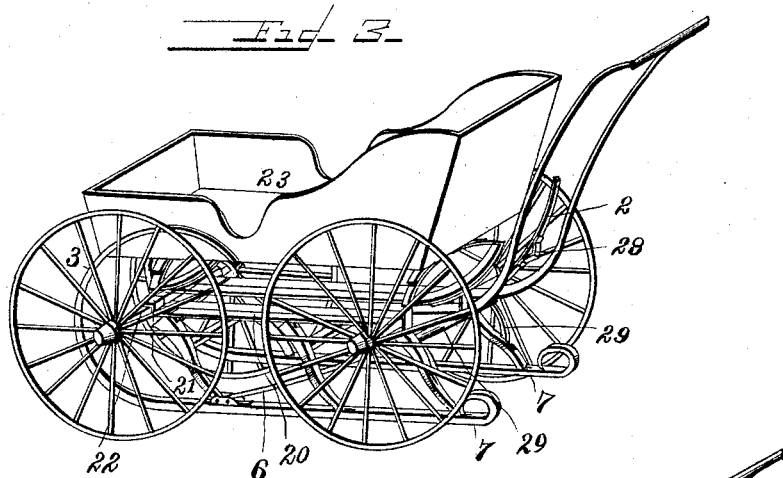
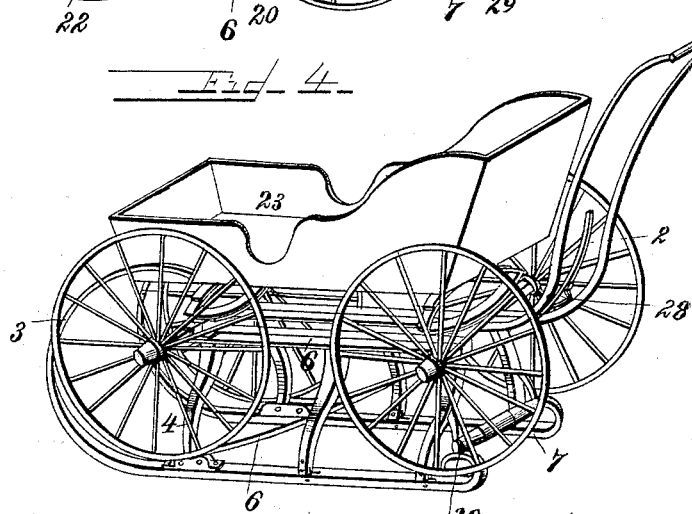
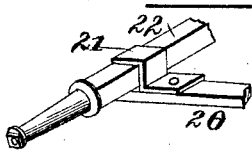
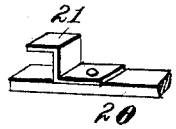
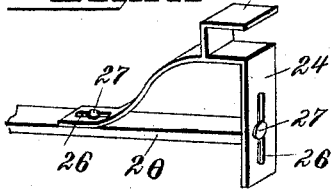
Witnesses
G. W. Tauberschmidt
A. S. Clarke
Inventor
Harry W. Ford
by
Harvey Spalding & Sons
his Attorneys

UNITED STATES PATENT OFFICE.

HARRY W. FORD, OF ADAMS, MASSACHUSETTS.

COMBINATION-VEHICLE.

SPECIFICATION forming part of Letters Patent No. 460,373, dated September 29, 1891.

Application filed March 16, 1891. Serial No. 385,192. (No model.)

*To all whom it may concern:*

Be it known that I, HARRY W. FORD, a citizen of the United States, residing at Adams, in the county of Berkshire and State of Massachusetts, have invented certain new and useful Improvements in Combination-Vehicles, of which the following is a specification.

My invention relates to a combination-vehicle adapted for use either as a sleigh or a wheeled vehicle; and it consists in the construction and combination of parts hereinafter described, whereby the device may be readily adjusted to serve either as a sleigh or carriage, as desired.

In the drawings, Figure 1 is a perspective view of my improved vehicle, the carriage-body being removed, showing the sleigh-runners and their attachments in elevated position. Fig. 2 is a similar view with the runners in a lowered position for use. Fig. 3 is a perspective view showing the carriage and its wheels in connection with the runners and their attachments, the latter being in a raised position to allow the wheels to support the vehicle. Fig. 4 is a perspective view similar to Fig. 3, except that the wheels are raised to allow the runners to support the vehicle. Figs. 5, 6, 7, 8, 9, and 10 are detail views illustrating the connecting and joining devices for the several parts.

Figs. 1 and 2 indicate the sleigh-runners, formed with upwardly-curved front ends 3. Numerals 4 4 indicate the sleigh-knees, arranged in pairs. I have shown three pairs 5, 6, and 7 in the drawings; but it will be understood that any preferred number of pairs may be employed. These knees are pivotally secured to the runners by any suitable devices. I have shown in the drawings three different forms of connecting means, any or all of which may be used.

In Fig. 5, 8 represents a bracket-bearing secured to the runner (one on each runner) and formed with pin-openings 9 and 10. The lower ends of the forward knees 5 are secured within the bracket-bearings by a pin. Within these bracket-bearings are also pivotally secured the ends of a forked adjusting-rod 12, which are held by pins passing through the openings 10. The second pair of knees 6 is secured by an angle link 13, resting in slots formed in the runners and on the ends of the knees, as clearly shown in Fig. 6, and held by pins 14. The rear knees are secured by a link, Fig. 7, consisting of a plate 15, formed with a headed projection 16, which latter enters a corresponding opening in the end of the knee, while the flatter portion of the link rests in a slot 17 in the runners. It will be apparent that with the connections thus described the knees will be capable of a limited rearward inclination with relation to the runners and that the runners may be moved by means of the adjusting-rod 12.

Fig. 2 shows the knees in vertical position and the runners lowered for use. The knees are secured together in pairs by cross-braces 18, and their upper ends are connected by hinge-joints 19 to parallel raves 20. Upon these raves, adjacent to their front ends, are secured clips 21, Figs. 8 and 9, to receive and secure the front axle 22 of a carriage 23. If the rear wheels of the carriage are of the same diameter as the front wheels, clips similar to the front clips 21 may be employed to secure the rear axle. However, as the rear wheels of the ordinary child's carriage are larger than the front wheels, I employ at the rear end of each of the raves 20 an adjustable bracket 24, provided with a clip 25 to secure the rear axle of the carriage in a plane above the front axle. The brackets 24 are each formed with elongated slots 25 and 26, through which pass set-screws 27, the slots permitting the required adjustment. The operating or adjusting rod 12 extends rearwardly and projects in upward inclination between the rear ends of the raves and over axle of carriage, and it is provided with catches 28 to engage the rear axle of the carriage, and thus hold the runners in their adjusted position. By pushing the rod 12 forward the runners are lowered and by drawing the rod backward the runners are raised.

The utility and operation of my improvement will be apparent. When the vehicle is desired for use as a carriage, the runners are raised clear of the ground by means of the rod 12, and the engagement of the rod with the rear axle secures the parts in position, permitting the wheels to rest on the ground. When it is desired to bring the runners into service, the rod 12 is disengaged from the rear axle, the runners are lowered by the bar, thus raising the wheels, and the upper catch of the bar 12 is engaged with the rear axle. To facilitate and assist in the adjustment of the parts I provide a foot-rod 29, secured to arms 30, pivotally secured to the rear knees of the sleigh. Pressure upon this foot-rod will operate to raise the carriage and lower the runners. When the runners are in raised position, the foot-rod may be turned up to rest upon the rear knees, as shown in Figs. 1 and 3.

I claim—

1. In a combination-vehicle, the combination, with sleigh-runners and parallel raves, of knees arranged in pairs and pivotally secured to the runners and raves, an adjusting-rod attached to the runners, and a foot-rod 29, substantially as set forth.

2. The combination, with the adjustable runners and the parallel raves, of clips secured upon the latter and a carriage-axle secured by said clips, substantially as set forth.

3. The combination, with the runners and parallel raves, of knees pivotally secured to said runners and raves, a forked adjusting-rod, a carriage secured by clips upon said raves, and a pivoted foot-rod, substantially as set forth.

4. The combination, with the runners and the front knees, of bracket-bearings secured to the runners, and a forked adjusting-rod secured within said bracket-bearings and provided with catches, and a foot-rod 29, substantially as set forth.

5. The combination, with the runners, raves, and pivoted knees, of clips to secure the carriage-axle, and an adjusting-rod provided with catches to engage the rear axle of the carriage, substantially as set forth.

In witness whereof I hereunto set my hand in the presence of two witnesses.

HARRY W. FORD.

Witnesses:
JAMES W. CARPENTER,
BERNHARD C. KOLP.